US008503565B2

(12) United States Patent
Lee et al.

(10) Patent No.: US 8,503,565 B2
(45) Date of Patent: Aug. 6, 2013

(54) MULTI-ANTENNA COMMUNICATION METHOD AND SYSTEM THEREOF

(75) Inventors: Woo Yong Lee, Daejeon (KR); Hyoung Jin Kwon, Daejeon (KR); Kyeongpyo Kim, Daejeon (KR); Jin Kyeong Kim, Daejeon (KR); Yong Sun Kim, Daejeon (KR); Jae Sup Lee, Daejeon (KR); Young-chai Ko, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 303 days.

(21) Appl. No.: 12/739,730

(22) PCT Filed: Oct. 23, 2008

(86) PCT No.: PCT/KR2008/006270
§ 371 (c)(1),
(2), (4) Date: Aug. 16, 2010

(87) PCT Pub. No.: WO2009/054685
PCT Pub. Date: Apr. 30, 2009

(65) Prior Publication Data
US 2010/0296599 A1    Nov. 25, 2010

(30) Foreign Application Priority Data

Oct. 25, 2007  (KR) .......................... 10-2007-0107946
Nov. 27, 2007  (KR) .......................... 10-2007-0121711
Aug. 1, 2008   (KR) .......................... 10-2008-0075687

(51) Int. Cl.
    *H04B 7/02* (2006.01)
(52) U.S. Cl.
    USPC ........... 375/267; 375/260; 375/262; 375/265; 375/340; 375/343; 375/346; 375/350
(58) Field of Classification Search
    USPC ................ 375/267, 260, 262, 265, 340, 343, 375/346, 347, 350; 370/203, 204, 205, 208, 370/209, 210
    See application file for complete search history.

(56) References Cited

U.S. PATENT DOCUMENTS

| 7,299,071 | B1 * | 11/2007 | Barratt et al. ............... 455/562.1 |
| 7,433,337 | B2 * | 10/2008 | Chao et al. ..................... 370/331 |
| 7,860,018 | B2 * | 12/2010 | Raith ............................ 370/252 |
| 7,933,560 | B2 * | 4/2011  | Han et al. ........................ 455/69 |
| 2005/0286663 | A1 * | 12/2005 | Poon ............................. 375/347 |

FOREIGN PATENT DOCUMENTS

| JP | 2005-509316 A | 4/2005 |
| KR | 1020020031694 A | 5/2002 |
| KR | 1020020076991 A | 10/2002 |
| WO | WO 2004/039011 A2 | 5/2004 |
| WO | WO 2006/020434 A2 | 2/2006 |
| WO | WO 2007/024935 A2 | 3/2007 |

OTHER PUBLICATIONS

International Search Report for PCT/KR2008/006270 filed Oct. 23, 2008.

* cited by examiner

*Primary Examiner* — Dhaval Patel

(57) ABSTRACT

A multiple antenna communication method and a multiple antenna communication system are provided. The multiple antenna communication method includes: determining a weighting vector with respect to a plurality of transmit antennas, using a spread spectrum code; determining a target transmission rate of each of the transmit antennas using the determined weighting vector; transmitting information associated with the target transmission rate to a multiple antenna reception apparatus; receiving, from the multiple antenna reception apparatus, channel information including information regarding whether to accept the transmitted target transmission rate information; and transmitting data to the multiple antenna reception apparatus using the received channel information.

17 Claims, 8 Drawing Sheets

MULTI-ANTENNA COMMUNICATION METHOD AND SYSTEM THEREOF

TECHNICAL FIELD

The present invention relates to a multiple antenna communication method and a multiple antenna communication system.

This work was supported by the IT R&D program of MIC/IITA. [2007-S-002-01, Development of Multi-Gigabit Air Interface Technology]

BACKGROUND ART

A Multiple Input Multiple Output (MIMO) technology may be essential in an application field such as a Wireless Personal Area Network (WPAN) requiring a high data transmission rate. However, in the case of multiple antennas having a plurality of radio frequency (RF) chains, a chip is very expensive due to the multiple antennas and the same number of RF chains and a high hardware complexity is required.

Also, in an antenna selection scheme of a millimeter wave radio transmission system, since on and off is repeated in an RF chain, the power consumption may be relatively large. Also, when the RF chain is switched from off to on, the complexity may significantly increase due to a reaction speed of super high frequency circuits. Although an optimal performance may be obtained, the above system may be inappropriate for the application field such as WPAN requiring a low price and a low power consumption.

Accordingly, there is a need for a multiple antenna communication technology that may reduce a power consumption and easily embody an RF chain.

DISCLOSURE OF INVENTION

Technical Goals

An aspect of the present invention provides a multiple antenna communication method and system that may reduce a power consumption and easily embody a radio frequency (RF) chain.

Another aspect of the present invention also provides a multiple antenna communication method and system that may perform adaptive modulation according to a channel environment and thereby may improve a frequency efficiency and a communication reliability.

Another aspect of the present invention also provides a multiple antenna communication method and system that may synthesize a transmitter/receiver and a radio transmission scheme based on a weighting vector quantization beamforming using a Walsh code and thereby may reduce a complexity.

The present invention is not limited to the above purposes and other purposes not described herein will be apparent to those of skill in the art from the following description.

Technical Solutions

According to an aspect of the present invention, there is provided a multiple antenna communication method including: determining a weighting vector with respect to a plurality of transmit antennas, using a spread spectrum code; determining a target transmission rate of each of the transmit antennas using the determined weighting vector; transmitting information associated with the target transmission rate to a multiple antenna reception apparatus; receiving, from the multiple antenna reception apparatus, channel information including information regarding whether to accept the transmitted target transmission rate information; and transmitting data to the multiple antenna reception apparatus using the received channel information.

In this instance, the multiple antenna communication method may further include: requesting the multiple antenna reception apparatus for a codebook index to determine the weighting vector; receiving the codebook index from the multiple antenna reception apparatus in response to the request; and performing a second decision for the weighting vector by referring to the received codebook index.

Also, the multiple antenna communication method may further include: changing the determined weighting vector to retransmit the target transmission rate when the channel information is not received from the multiple antenna reception apparatus for a predetermined period of time.

Also, the multiple antenna communication method may further include: changing the determined weighting vector to retransmit the data when a reception confirm message for the transmitted data is not received from the multiple antenna reception apparatus for a predetermined period of time.

Also, the multiple antenna communication method may further include: retransmitting the target transmission rate in order to reset a communication link in association with changing of the weighting vector.

Also, the spread spectrum code may include a Walsh code or a Hadamard matrix.

According to another aspect of the present invention, there is provided a multiple antenna communication method including: determining a weighting vector with respect to a plurality of receive antennas, using a spread spectrum code; measuring a channel state value of each of the receive antennas using the determined weighting value; comparing the measured channel state value and a predetermined codebook value in advance to determine whether to accept information associated with the target transmission rate that is transmitted from a multiple antenna transmission apparatus; and feeding back, to the multiple antenna transmission apparatus, channel information including information regarding whether to accept the transmitted target transmission rate information.

In this instance, the multiple antenna communication method may further include: searching for a codebook index to determine a weighting vector of each transmit antenna of the multiple antenna transmission apparatus through comparison between the channel state value and the codebook value in response to a request from the multiple antenna transmission apparatus; and transmitting the retrieved codebook index to the multiple antenna transmission apparatus.

Also, the determining of the weighting vector may include: predicting a channel associated with the plurality of receive antennas; and determining the weighting vector with respect to the plurality of receive antennas based on the predicted channel.

According to still another aspect of the present invention, there is provided a multiple antenna communication method including: receiving a channel state value that is measured by a plurality of receive antennas of a multiple antenna reception apparatus, via a plurality of transmit antennas; determining a modulation scheme and a target transmission rate based on the received channel state value; and modulating data according to the determined modulation scheme to transmit the modulated data to the multiple antenna reception apparatus at the determined target transmission rate.

In this instance, the determining of the modulation scheme and the target transmission rate may include: determining a corresponding channel state is excellent to determine the modulation scheme and the target transmission rate as a high order modulation scheme and a high target transmission rate when the received channel state value is greater than or equal to a predetermined value; or determining the corresponding channel state is poor to determine the modulation scheme and the target transmission rate as a low order modulation scheme and a low target transmission rate when the received channel stage value is less than the predetermined value.

According to yet another aspect of the present invention, there is provided a multiple antenna communication system including: a vector decision unit to determine a weighting vector with respect to a plurality of transmit antennas, using a spread spectrum code; a transmission rate decision unit to determine a target transmission rate of each of the transmit antennas using the determined weighting vector; a transmitter to transmit information associated with the target transmission rate to a multiple antenna reception apparatus; and a receiver to receive, from the multiple antenna reception apparatus, channel information including information regarding whether to accept the transmitted target transmission rate information, wherein the transmitter transmits data to the multiple antenna reception apparatus using the received channel information.

In this instance, the receiver may request the multiple antenna reception apparatus for a codebook index to determine the weighting vector and receives the codebook index from the multiple antenna reception apparatus in response to the request. The vector decision unit may perform a second decision for the weighting vector by referring to the received codebook index.

Also, when the channel information is not received from the multiple antenna reception apparatus for a predetermined period of time, the vector decision unit may change the determined weighting vector. The transmitter may retransmit the target transmission rate that is re-determined based on the changed weighting vector.

Also, when a reception confirm message for the transmitted data is not received from the multiple antenna reception apparatus for a predetermined period of time, the vector decision unit may change the determined weighting vector. The transmitter may retransmit the data at the target transmission rate that is re-determined based on the changed weighting vector.

Also, the spread spectrum code may include a Walsh code or a Hadamard matrix.

According to a further another aspect of the present invention, there is provided a multiple antenna communication system including: a vector decision unit to determine a weighting vector with respect to a plurality of receive antennas, using a spread spectrum code; a channel measurement unit to measure a channel state value of each of the receive antennas using the determined weighting value; a decision unit to compare the measured channel state value and a predetermined codebook value in advance and determine whether to accept information associated with the target transmission rate that is transmitted from a multiple antenna transmission apparatus; and a transmitter to feed back, to the multiple antenna transmission apparatus, channel information including information regarding whether to accept the transmitted target transmission rate information.

In this instance, the multiple antenna communication system may further include: a search unit to search for a codebook index for determining of a weighting vector of each transmit antenna of the multiple antenna transmission apparatus through comparison between the channel state value and the codebook value in response to a request from the multiple antenna transmission apparatus. The transmitter may transmit the retrieved codebook index to the multiple antenna transmission apparatus.

Also, the vector decision unit may predict a channel associated with the plurality of receive antennas and determines the weighting vector with respect to the plurality of receive antennas based on the predicted channel.

Specific aspects of embodiments will be included in the detailed description and the accompanying drawings.

Additional aspects and features of the invention and the achieving methods thereof will be set forth in part in the description which follows and, in part, will be apparent from the description and the accompanying drawings. However, the present invention is not limited by following embodiments and may be embodied into various types. The embodiments are provided to complete the disclosure of the invention and inform those skilled in the art of the scope of the invention. The invention is defined by the claims, wherein like reference numerals refer to the like elements throughout.

Advantageous Effects

According to embodiments of the present invention, it is possible to reduce a power consumption and easily embody a radio frequency (RF) chain.

Also, according to embodiments of the present invention, it is possible to improve a frequency efficiency and a communication reliability by performing an adaptive modulation according to a channel environment.

Also, according to embodiments of the present invention, it is possible to reduce a complexity of a multiple antenna communication system by synthesizing a transmitter/receiver and a radio transmission scheme based on a weighting vector quantization beamforming using a Walsh code.

BEST MODE FOR CARRYING OUT THE INVENTION

Figure 1:
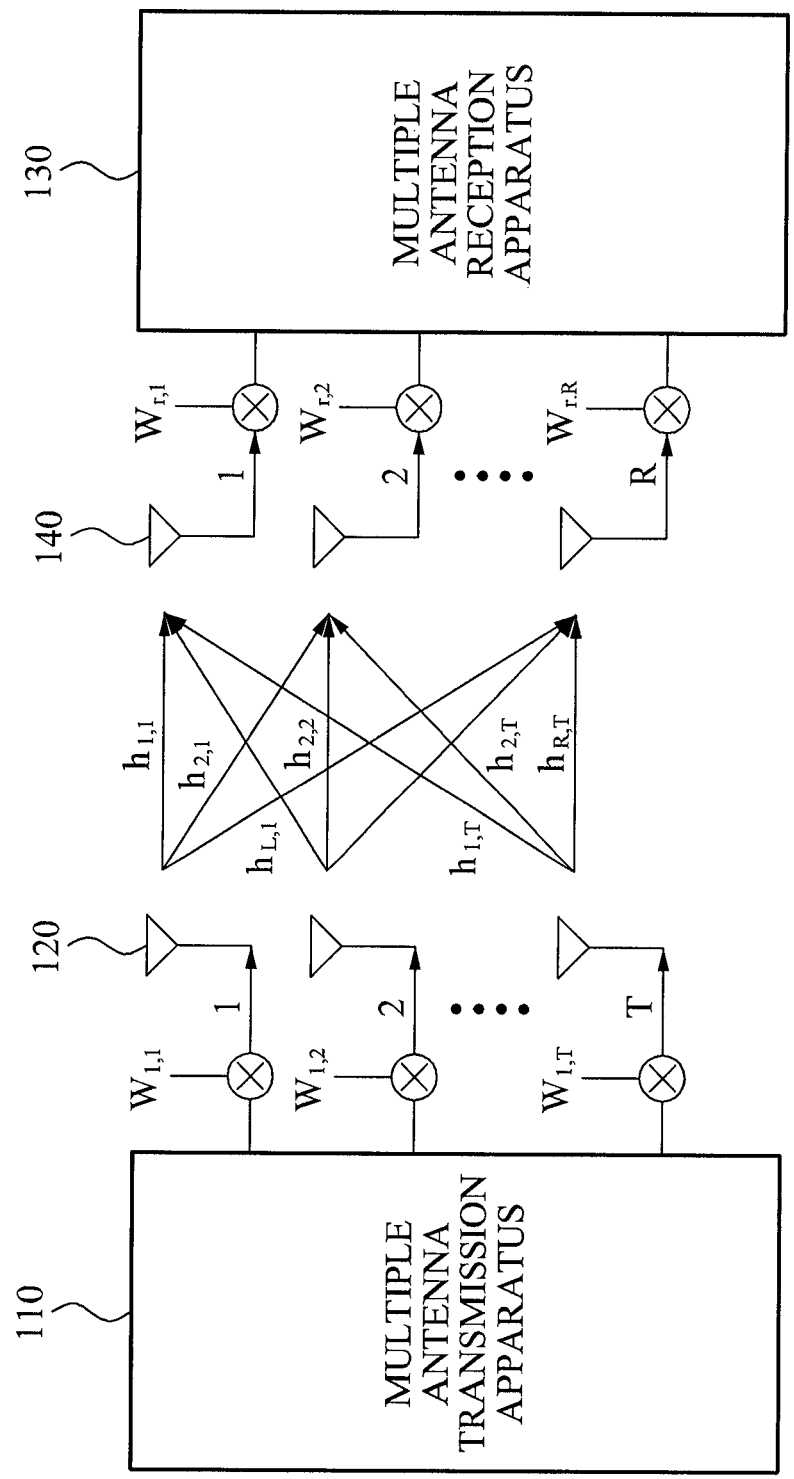
FIG. 1 illustrates a conceptual diagram for explaining a multiple antenna communication system according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

Hereinafter, a multiple antenna communication system and method according to an embodiment of the present invention will be described in detail with reference to the accompanying drawings.

FIG. 1 illustrates a conceptual diagram for explaining a multiple antenna communication system according to an embodiment of the present invention.

Referring to FIG. 1, the multiple antenna communication system includes a multiple antenna transmission apparatus 110 and a multiple antenna reception apparatus 130.

The multiple antenna transmission apparatus 110 may determine a weighting vector with respect to a plurality of transmit antennas 120, using a spread spectrum code, and determine a target transmission rate of each of the transmit antennas 120 using the determined weighting vector. Also, the multiple antenna transmission apparatus 110 may transmit information associated with the target transmission rate to the multiple antenna reception apparatus 130 and receive, from the multiple antenna reception apparatus 130, channel information including information regarding whether to accept the transmitted target transmission rate information. The multiple antenna transmission apparatus 110 may transmit data to the multiple antenna reception apparatus 130 using the received channel information.

The multiple antenna reception apparatus 130 may determine a weighting vector with respect to a plurality of receive antennas 140, using a spread spectrum code, and measure a channel state value of each of the receive antennas 140 using the determined weighting value. Also, the multiple antenna reception apparatus 130 may compare the measured channel state value and a predetermined codebook value in advance to determine whether to accept information associated with the target transmission rate that is transmitted from the multiple antenna transmission apparatus 110. The multiple antenna reception apparatus 130 may feed back, to the multiple antenna transmission apparatus 110, channel information including information regarding whether to accept the transmitted target transmission rate information.

Hereinafter, the multiple antenna transmission apparatus 110 and the multiple antenna reception apparatus 130 will be further described in detail.

Figure 2:
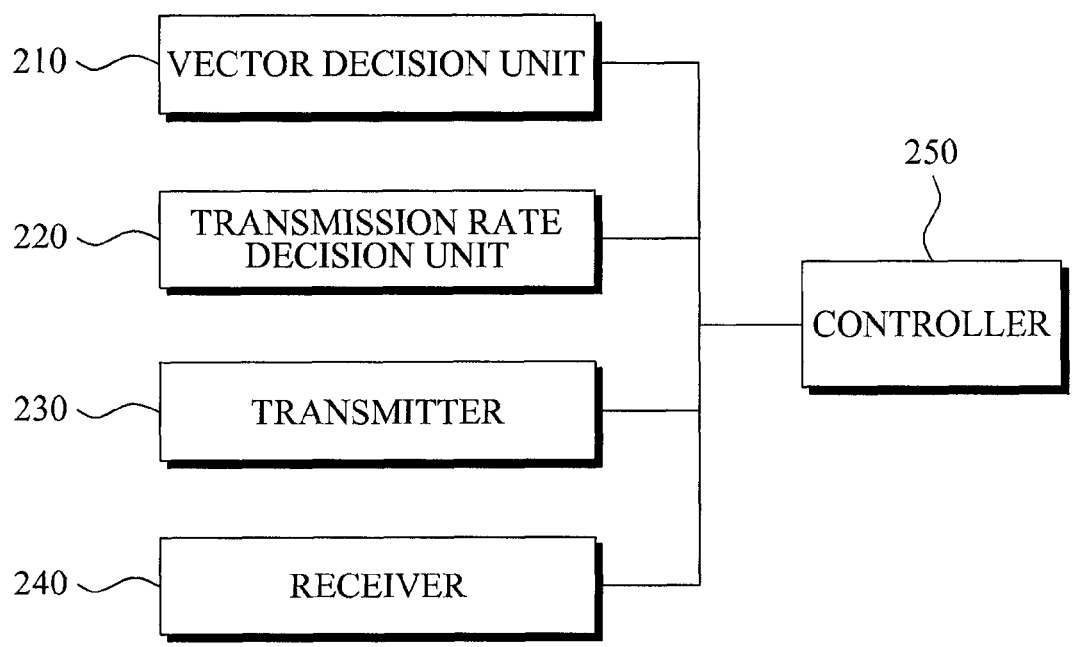
FIG. 2 is a block diagram illustrating a multiple antenna transmission apparatus of FIG. 1.

FIG. 2 is a block diagram illustrating the multiple antenna transmission apparatus 110 of FIG. 1.

Referring to FIGS. 1 and 2, the multiple antenna transmission apparatus 110 may include a vector decision unit 210, a transmission rate decision unit 220, a transmitter 230, a receiver 240, and a controller 250.

The vector decision unit 210 may determine a weighting vector with respect to the plurality of transmit antennas 120, using a spread spectrum code. The spread spectrum code may include a Walsh code or a Hadamard matrix. Specifically, the vector decision unit 210 may determine the weighting vector of each of the transmit antennas 120 using the Walsh code or the Hadamard matrix.

When a codebook index is received by the receiver 240, the vector decision unit 210 may perform a second decision for the weighting vector by referring to the received codebook index.

Specifically, the vector decision unit 210 may determine a predetermined weighting vector with respect to the plurality of transmit antennas 120, using the Walsh code or the Hadamard matrix. The vector decision unit 210 may make a final decision for the weighting vector of each of the transmit antennas 120 using the codebook index received from the multiple antenna reception apparatus 130.

When channel information including information regarding whether to accept information associated with a target transmission rate is not received from the multiple antenna reception apparatus 130 for a predetermined period of time, the vector decision unit 210 may change the determined weighting vector. Accordingly, the transmitter 230 may retransmit, to the multiple antenna reception apparatus 130, the target transmission rate that is re-determined based on the changed weighting vector.

When a reception confirm message for the transmitted data is not received from the multiple antenna reception apparatus 130 for the predetermined period of time, the vector decision unit 210 may change the determined weighting vector. Accordingly, the transmitter 230 may retransmit the data at the target transmission rate that is re-determined based on the changed weighting vector.

The transmission rate decision unit 220 may determine a target transmission rate of each of the transmit antennas 120 using the determined weighting vector. For this, the transmission rate decision unit 220 may receive a channel state value from the multiple antenna reception apparatus 130 via the transmit antenna 120 of which the weighting vector is determined, and use the received channel state value as basic information for determining the target transmission rate.

Specifically, when the received channel state value signifies the state is excellent, the transmission rate decision unit 220 may set the target transmission rate of the transmit antenna 120 to be high. Conversely, when the received channel state value signifies the state is poor, the transmission rate decision unit 220 may set the target transmission rate of the transmit antenna 12 to be low.

The transmitter 230 may transmit information associated with the determined target transmission rate to the multiple antenna reception apparatus 130. When the receiver 240 receives the channel information including information regarding whether to accept the target transmission rate information, the transmitter 230 may transmit data to the multiple antenna reception apparatus 130 using the received channel information. Specifically, when the multiple antenna reception apparatus 130 accepts the target transmission rate information, the transmitter 230 may transmit the data to the multiple antenna reception apparatus 130 at the target transmission rate.

The receiver 240 may receive, from the multiple antenna reception apparatus 130, channel information including information regarding whether to accept the transmitted target transmission rate information. The transmitter 230 may transmit the data to the multiple antenna reception apparatus 130 using the received channel information.

The receiver 240 may request the multiple antenna reception apparatus 130 for a codebook index to determine the weighting vector. The codebook may be classified into a short codebook and a long codebook. The receiver 240 may transmit, to the multiple antenna reception apparatus 130, a single bit for identifying the short codebook and the long codebook to thereby request for any one of the short codebook and the long codebook. In response to the request, the receiver 240 may receive an index of any one of the short codebook and the long codebook. The receiver 240 may match a number of feedback bits used in the short codebook and a number of bits of the long codebook by repeatedly using bits of the short codebook. The vector decision unit 210 may make a final decision for the weighting vector of each of the transmit antennas 120 by referring to the received codebook index.

The controller 250 functions to control the multiple antenna transmission apparatus 110. Specifically, the controller 250 may control operations of the multiple antenna transmission apparatus 110 that includes the vector decision unit 210, the transmission rate decision unit 220, the transmitter 230, the receiver 240, and the like.

Figure 3:
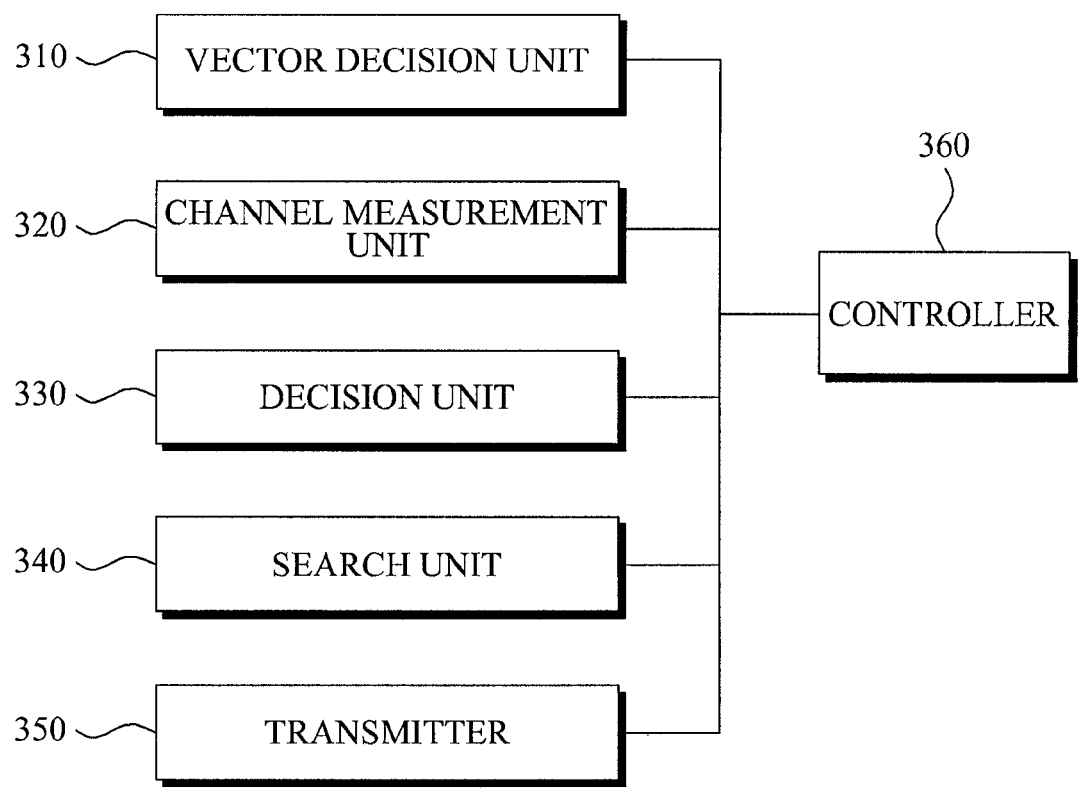
FIG. 3 is a block diagram illustrating a multiple antenna reception apparatus of FIG. 1.

FIG. 3 is a block diagram illustrating the multiple antenna reception apparatus 130 of FIG. 1.

Referring to FIGS. 1 and 3, the multiple antenna reception apparatus 130 may include a vector decision unit 310, a channel measurement unit 320, a decision unit 330, a search unit 340, a transmitter 350, and a controller 360.

The vector decision unit 310 may determine a weighting vector with respect to the plurality of receive antennas 140, using a spread spectrum code. The spread spectrum code may include a Walsh code or a Hadamard matrix. Specifically, the vector decision unit 310 may determine the weighting vector of each of the receive antennas 140 using the Walsh code or the Hadamard matrix.

Also, the vector decision unit 310 may predict a channel associated with the plurality of receive antennas 140 and determine the weighting vector with respect to the plurality of receive antennas 140 based on the predicted channel.

The channel measurement unit 320 may measure a channel state value of each of the receive antennas 140 using the determined weighting value.

The decision unit 330 may compare the measured channel state value and a predetermined codebook value in advance and determine whether to accept information associated with the target transmission rate that is transmitted from the multiple antenna transmission apparatus 110.

Specifically, when the measured channel state value is greater than or equal to the codebook value, the decision unit 330 may determine to accept the target transmission rate information. Conversely, when the measured channel state value is less than the codebook value, the decision unit 330 may determine not to accept the target transmission rate information.

The search unit 340 may search for a codebook index for determining of a weighting vector of each transmit antenna of the multiple antenna transmission apparatus 110 through comparison between the channel state value and the codebook value in response to a request from the multiple antenna transmission apparatus 110.

Specifically, when the channel state value is greater than or equal to the codebook value, the search unit 340 may search a predetermined database for the codebook index. The transmitter 350 may transmit the retrieved codebook index to the multiple antenna transmission apparatus 110.

The transmitter 350 may feed back, to the multiple antenna transmission apparatus 110, channel information including information regarding whether to accept the transmitted target transmission rate information. For example, the transmitter 350 may feed back, to the multiple antenna transmission apparatus 110, information regarding whether to accept the target transmission rate information and the channel state value.

The transmitter 350 may transmit the retrieved codebook index to the multiple antenna transmission apparatus 110 in response to a request from the multiple antenna transmission apparatus 110.

The controller 360 functions to control the multiple antenna reception apparatus 130. Specifically, the controller 360 may control operations of the multiple antenna reception apparatus 130 that includes the vector decision unit 310, the channel measurement unit 320, the decision unit 330, the search unit 340, the transmitter 350, and the like.

Figure 4:
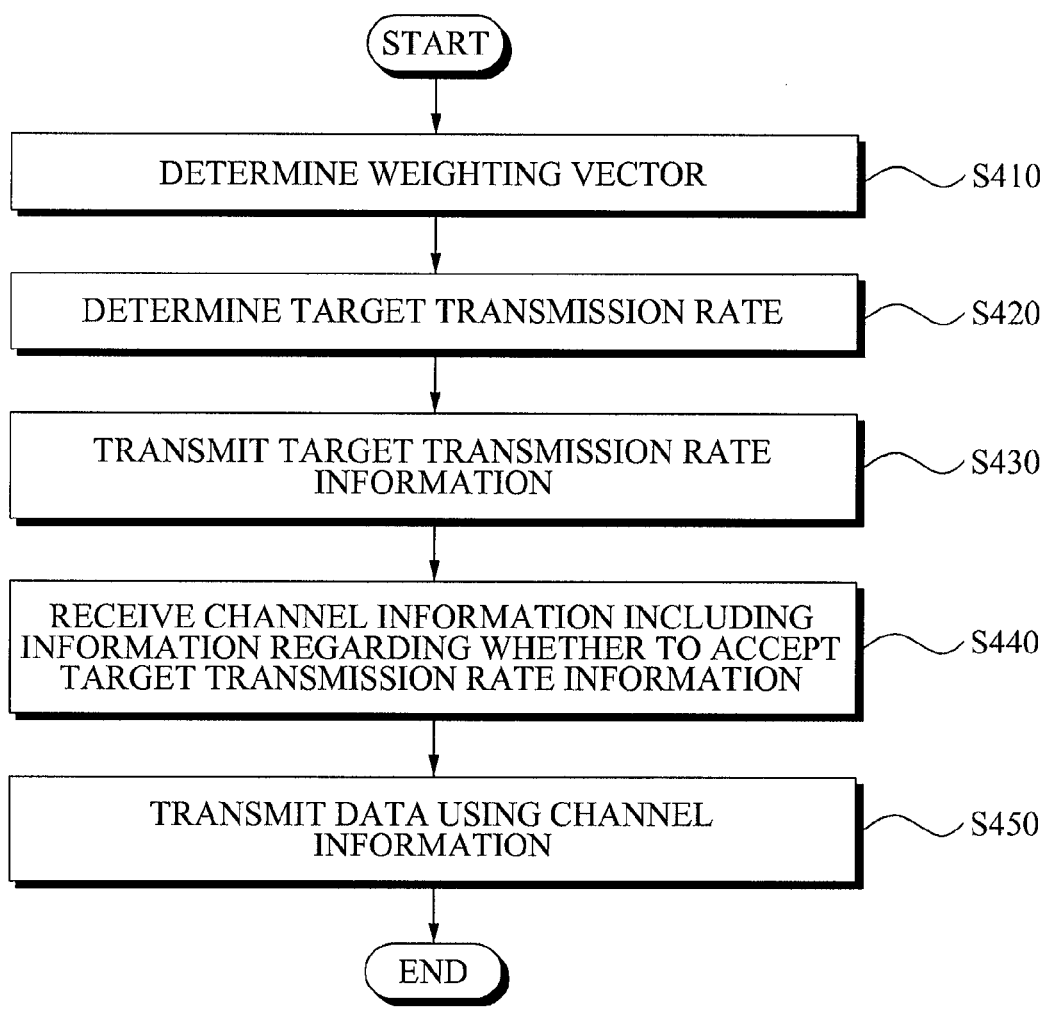
FIG. 4 is a flowchart illustrating a multiple antenna communication method according to an embodiment of the present invention.

FIG. 4 is a flowchart illustrating a multiple antenna communication method according to an embodiment of the present invention. The multiple antenna communication method may be performed by the multiple antenna transmission apparatus 110 of FIG. 1.

Referring to FIGS. 1 and 4, in operation S410, the multiple antenna transmission apparatus 110 may determine a weighting vector with respect to the plurality of transmit antennas 120, using a spread spectrum code. The spread spectrum code may include a Walsh code or a Hadamard matrix. Specifically, the multiple antenna transmission apparatus 110 may determine the weighting vector of each of the transmit antennas 120 using the Walsh code or the Hadamard matrix.

When a codebook index is received from the multiple antenna reception apparatus 130, the multiple antenna transmission apparatus 110 may perform a second decision for the weighting vector by referring to the received codebook index.

Specifically, the multiple antenna transmission apparatus 110 may determine a predetermined weighting vector with respect to the plurality of transmit antennas 120, using the Walsh code or the Hadamard matrix. The multiple antenna transmission apparatus 110 may make a final decision for the weighting vector of each of the transmit antennas 120 using the codebook index received from the multiple antenna reception apparatus 130.

When channel information including information regarding whether to accept information associated with a target transmission rate is not received from the multiple antenna reception apparatus 130 for a predetermined period of time, the multiple antenna transmission apparatus 110 may change the determined weighting vector. Also, the multiple antenna transmission apparatus 110 may retransmit the target transmission rate to the multiple antenna reception apparatus 130 in order to reset a communication link in association with changing of the weighting vector.

Accordingly, the multiple antenna transmission apparatus 110 may retransmit, to the multiple antenna reception apparatus 130, the target transmission rate that is re-determined based on the changed weighting vector.

When a reception confirm message for the transmitted data is not received from the multiple antenna reception apparatus 130 for the predetermined period of time, the multiple antenna transmission apparatus 110 may change the determined weighting vector. Accordingly, the multiple antenna transmission apparatus 110 may retransmit the data at the target transmission rate that is re-determined based on the changed weighting vector.

In operation S420, the multiple antenna transmission apparatus 110 may determine a target transmission rate of each of the transmit antennas 120 using the determined weighting vector. For this, the multiple antenna transmission apparatus 110 may receive a channel state value from the multiple antenna reception apparatus 130 via the transmit antenna 120 of which the weighting vector is determined, and use the received channel state value as basic information for determining the target transmission rate.

Specifically, when the received channel state value is signifies the state is excellent, the multiple antenna transmission apparatus 110 may set the target transmission rate of the transmit antenna 120 to be high. Conversely, when the received channel state value signifies the state is poor, the multiple antenna transmission apparatus 110 may set the target transmission rate of the transmit antenna 12 to be low.

In operation S430, the multiple antenna transmission apparatus 110 may transmit information associated with the determined target transmission rate to the multiple antenna reception apparatus 130. When the channel information including information regarding whether to accept the target transmission rate information is received, the multiple antenna transmission apparatus 110 may transmit data to the multiple antenna reception apparatus 130 using the received channel information. Specifically, when the multiple antenna reception apparatus 130 accepts the target transmission rate information, the multiple antenna transmission apparatus 110 may transmit the data to the multiple antenna reception apparatus 130 at the target transmission rate.

In operation S440, the multiple antenna transmission apparatus 110 may receive, from the multiple antenna reception apparatus 130, channel information including information regarding whether to accept the transmitted target transmission rate information.

The multiple antenna transmission apparatus 110 may request the multiple antenna reception apparatus 130 for a codebook index to determine of the weighting vector, and receive the codebook index from the multiple antenna reception apparatus 130 in response to the request. The multiple antenna transmission apparatus 110 may make a final decision for the weighting vector of each of the transmit antennas 120 by referring to the received codebook index.

In operation S450, the multiple antenna transmission apparatus 110 may transmit data to the multiple antenna reception apparatus 130 using the received channel information.

Figure 5:
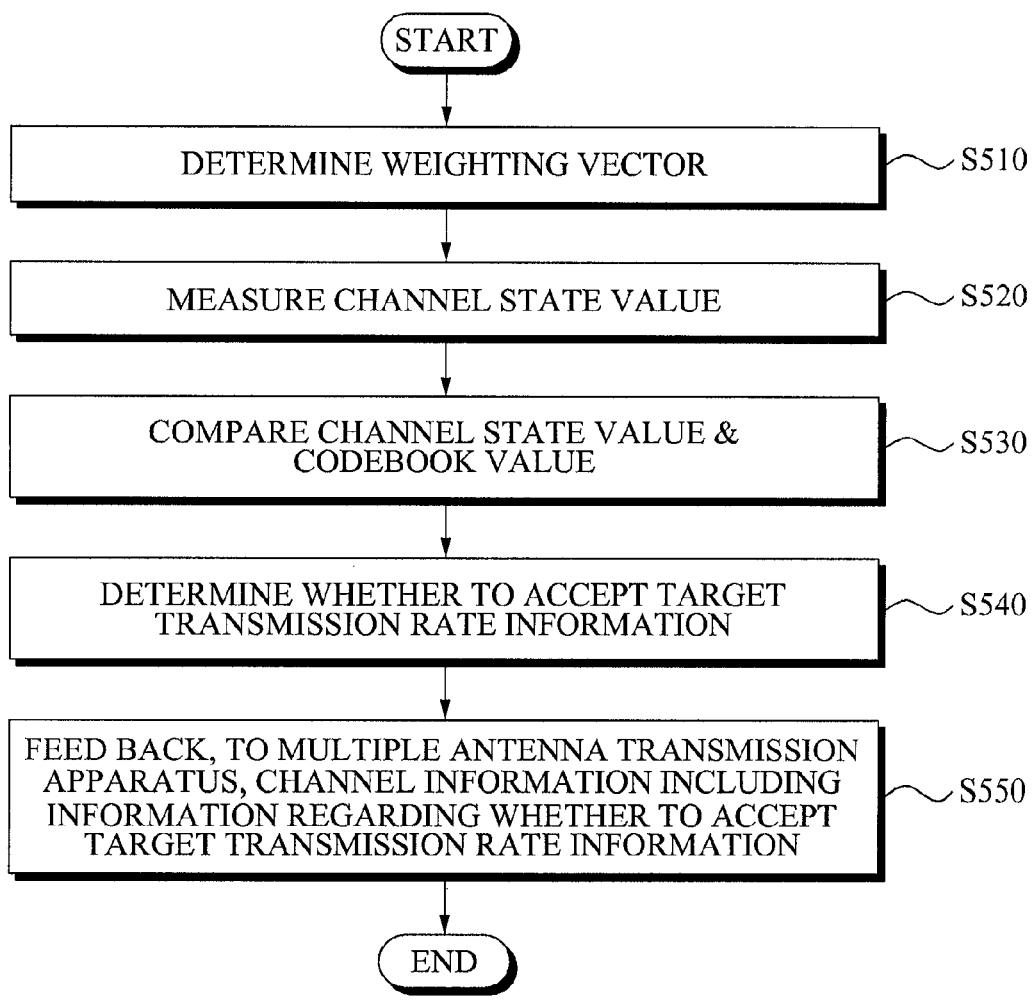
FIG. 5 is a flowchart illustrating a multiple antenna communication method according to another embodiment of the present invention.

FIG. 5 is a flowchart illustrating a multiple antenna communication method according to another embodiment of the present invention. The multiple antenna communication method may be performed by the multiple antenna reception apparatus 130 of FIG. 1.

Referring to FIGS. 1 and 5, in operation S510, the multiple antenna reception apparatus 130 may determine a weighting vector with respect to the plurality of receive antennas 140, using a spread spectrum code. The spread spectrum code may include a Walsh code or a Hadamard matrix. Specifically, the multiple antenna reception apparatus 130 may determine the weighting vector of each of the receive antennas 140 using the Walsh code or the Hadamard matrix.

Also, the multiple antenna reception apparatus 130 may predict a channel associated with the plurality of receive antennas 140 and determine the weighting vector with respect to the plurality of receive antennas 140 based on the predicted channel.

In operation S520, the multiple antenna reception apparatus 130 may measure a channel state value of each of the receive antennas 140 using the determined weighting value.

In operation 530, the multiple antenna reception apparatus 130 may compare the measured channel state value and a predetermined codebook value in advance.

In operation S540, the multiple antenna reception apparatus 130 may determine whether to accept information associated with the target transmission rate that is transmitted from the multiple antenna transmission apparatus 110. Specifically, when the measured channel state value is greater than or equal to the codebook value, the multiple antenna reception apparatus 130 may determine to accept the target transmission rate information. Conversely, when the measured channel state value is less than the codebook value, the multiple antenna reception apparatus 130 may determine not to accept the target transmission rate information.

When a request for a codebook index for determining of the weighting vector of the transmit antenna 120 of the multiple antenna transmission apparatus 110 is received from the multiple antenna transmission apparatus 110, the multiple antenna reception apparatus 130 may search for the codebook index through operation S530.

Specifically, when the channel state value is greater than or equal to the codebook value, the multiple antenna reception apparatus 130 may search a predetermined database for the codebook index. The multiple antenna reception apparatus 130 may transmit the retrieved codebook index to the multiple antenna transmission apparatus 110.

In operation S550, the multiple antenna reception apparatus 130 may feed back, to the multiple antenna transmission apparatus 110, channel information including information regarding whether to accept the transmitted target transmission rate information. For example, the multiple antenna reception apparatus 130 may feed back, to the multiple antenna transmission apparatus 110, information regarding whether to accept the target transmission rate information and the channel state value.

The multiple antenna reception apparatus 130 may transmit the retrieved codebook index to the multiple antenna transmission apparatus 110 in response to a request from the multiple antenna transmission apparatus 110.

Figure 6:
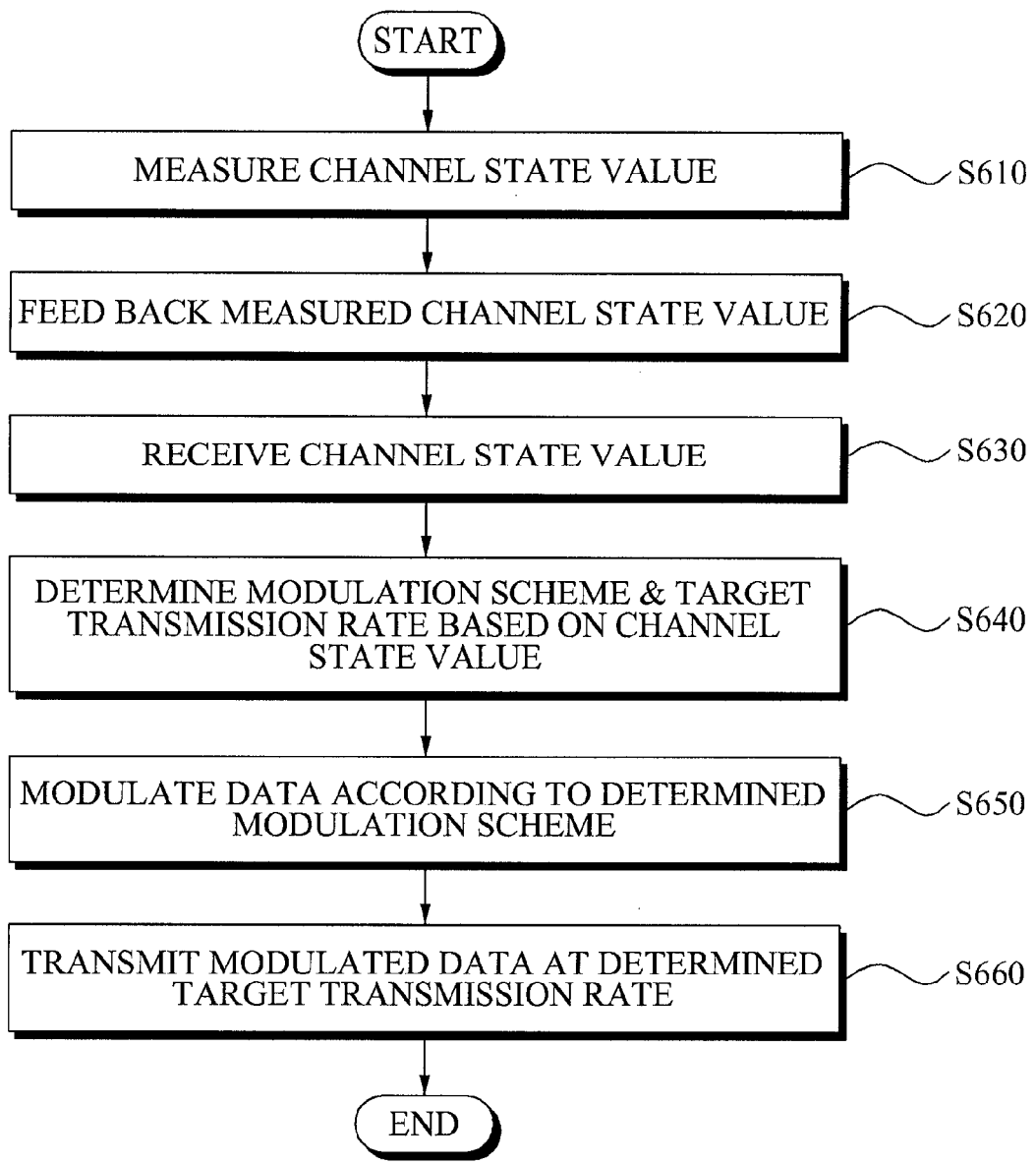
FIG. 6 is a flowchart illustrating a multiple antenna communication method according to still another embodiment of the present invention.

FIG. 6 is a flowchart illustrating a multiple antenna communication method according to still another embodiment of the present invention.

Referring to FIGS. 1 and 6, in operation S610, the multiple antenna reception apparatus 130 may measure a channel state value via the plurality of receive antennas 140.

In operation S620, the multiple antenna reception apparatus 130 may feed back the measured channel state value to the multiple antenna transmission apparatus 110.

In operation S630, the multiple antenna transmission apparatus 110 may receive a channel state value that is measured by the receive antenna 140 of the multiple antenna reception apparatus 130, via the plurality of transmit antennas 120 may receive the measured channel state value via the plurality of transmit antennas.

In operation S640, the multiple antenna transmission apparatus 110 may determine a modulation scheme and a target transmission rate based on the received channel state value.

When the received channel state value is greater than or equal to a predetermined value, the multiple antenna transmission apparatus 110 may determine a corresponding channel state is excellent and determine the modulation scheme and the target transmission rate as a high order modulation scheme and a high target transmission rate.

Conversely, when the received channel stage value is less than the predetermined value, the multiple antenna transmission apparatus 110 may determine the corresponding channel state is poor to determine the modulation scheme and the target transmission rate as a low order modulation scheme and a low target transmission rate.

In operation S650, the multiple antenna transmission apparatus 110 may modulate data according to the determined modulation scheme.

In operation S660, the multiple antenna transmission apparatus 110 may transmit the modulated data to the multiple antenna reception apparatus 130 at the determined target transmission rate.

In FIG. 1, beamforming may be performed by maximizing weight $W_{t,j}$ (j=1, 2, ..., T) of the transmit antennas 120 of the multiple antenna transmission apparatus 110 and weight $W_{r,k}$ (k=1, 2, ..., R) of the receive antennas 140 of the multiple antenna reception apparatus 130 with respect to a signal-to-noise ratio (SNR).

The weighting vector of the multiple antenna transmission apparatus 110 and the multiple antenna reception apparatus 130 may be expressed as, Weighting vector:

$$W_t = [W_{t,1}, W_{t,2}, \ldots, W_{t,T}]^T \|W_t\| = \Omega_t: \text{Transmit power}$$
$$W_r = [W_{r,1}, W_{r,2}, \ldots, W_{r,R}]^T.$$

[Equation 1]

When a transmission signal of the multiple antenna transmission apparatus 110 is S and a radio channel H is expressed as a matrix as given by the following Equation 2, a received signal r may be expressed as the following Equation 3.

$$H = \begin{bmatrix} h_{1,1} & h_{1,2} & \cdots & h_{1,T} \\ h_{2,1} & h_{2,2} & \cdots & h_{2,T} \\ \vdots & \cdots & \ddots & \vdots \\ h_{R,1} & h_{R,2} & \cdots & h_{R,T} \end{bmatrix}_{R \times T}.$$ [Equation 2]

$$r = Hw_t S + n,$$ [Equation 3]

where n denotes additive white Gaussian noise (AWGN) and is in a vector form of Rx1.

In this instance, when a received weighting vector $W_r$ of a beamforming antenna of the multiple antenna reception apparatus 130 is multiplied with the S and the H, a final beamforming output signal may be given by, $$y = w_r^H r = w_r^H H w_t S + w_r^H n.$$ [Equation 4]

When an SNR of the received signal after beamforming of the multiple antenna reception apparatus 130 is acquired from the above Equation 4, it may be given by, $$\mu = \frac{|w_r^H H w_t|^2}{|w_r^H n|^2} = \frac{|w_r^H H w_t|^2}{|w_r^H n|^2} = \frac{|w_r^H H w_t|^2}{|w_r|^2 \sigma_n^2}.$$ [Equation 5]

A process of calculating $W_r$ and $W_t$ maximizing the SNR of the received signal is disclosed in "maximum ratio transmission", in IEEE Trans. Commun., Vol. 47, No. 10, pp. 1458-1461, 1999 (General description in calculating the weighting vectors) by T.K.Y.Lo. When calculating $W_r$ and $W_t$ maximizes a wireless communication system, it may be expressed as, $$W_t = U_{max} \sqrt{\Omega_t},$$

$$W_r = \alpha H W_t,$$ [Equation 6]

where $U_{max}$ denotes a corresponding eigenvector when a maximum eigenvalue of $H^H H$ is $\lambda_{max}$, and α denotes a constant.

In a system using actual beamforming, the multiple antenna reception apparatus 130 may predict the channel H, calculate the weighting vector $W_t$ based on the predicted channel H, and feed back the calculated weighting vector to the multiple antenna transmission apparatus 110.

The beamforming weighting vector $W_t$ of the transmit antenna 120 may be fed back to the multiple antenna transmission apparatus 110 using two schemes. A first scheme is to quantize, into a particular number of bits, a phase or amplitude that is a calculated result of $W_t$ and thereby feed back the quantized bits. A second scheme is to transmit, by the multiple antenna transmission apparatus 110 and the multiple antenna reception apparatus 130, a codebook index capable of generating an optimal weighting vector $W_t$ using a codebook table.

In the codebook index scheme, when the codebook size is T×N, a minimum index value of N corresponding to a column size may need to have a ceiling of Log 2(N). The codebook size may also increase as N increases. Generally, the codebook size may be maintained to be at a minimum in order to reduce a complexity. In this instance, the multiple antenna reception apparatus 130 may generate the codebook in an orthogonal random matrix, search for a codebook index for each column vector and a maximum SNR, and feed back the retrieved codebook index to the multiple antenna transmission apparatus 110.

A scheme of using an identity matrix as a minimum codebook form is proposed in "Opportunistic Beamforming with limited feedback", in IEEE Trans Wireless Commun., Vol. 6, No. 8, pp. 2765-2771, August 2007, by S. Sanayei and A. Nosratinia. According to S. Sanayei and A. Nosratinia, since a single transmit antenna is used for beamforming of a multiple antenna transmission apparatus, it is possible to reduce a complexity in feedback transmission.

However, when a radio frequency (RF) chain is repeatedly switched on and off in a transceiver requiring a high frequency circuit, a millimeter wave system may have a relatively large power loss. Also, due to a reaction speed when the RF chain is switched from off to on, it is difficult to embody the millimeter wave system. According to the present invention, a Walsh code or a Hadamard matrix is proposed as a scheme of maintaining the minimum codebook, showing the same performance as the identity matrix, without being required to be switched on/off, and simply shifting a phase to zero degrees and 180 degrees at all times.

For example, when a number of antennas is two or four, the Walsh code may be expressed as, $$\frac{1}{\sqrt{2}} \begin{bmatrix} 1 & 1 \\ 1 & -1 \end{bmatrix},$$ [Equation 7]

$$\frac{1}{2} \begin{bmatrix} 1 & 1 & 1 & 1 \\ 1 & -1 & 1 & -1 \\ 1 & 1 & -1 & -1 \\ 1 & -1 & -1 & 1 \end{bmatrix}.$$

Generally, Walsh code C corresponding to $2^k$ antennas may be expressed as, $$C = \frac{A \otimes B}{\sqrt{2^k}},$$ [Equation 8]

where A denotes Walsh code when the number of antennas is $2^m$ antennas, B satisfies $2^k = 2^m \times 2^n$ when the number of antennas is $2^n$, and ⊗ denotes a Kronecker product. The Walsh code C may be used as the codebook when the number of antennas is $2^k$.

Figure 7:
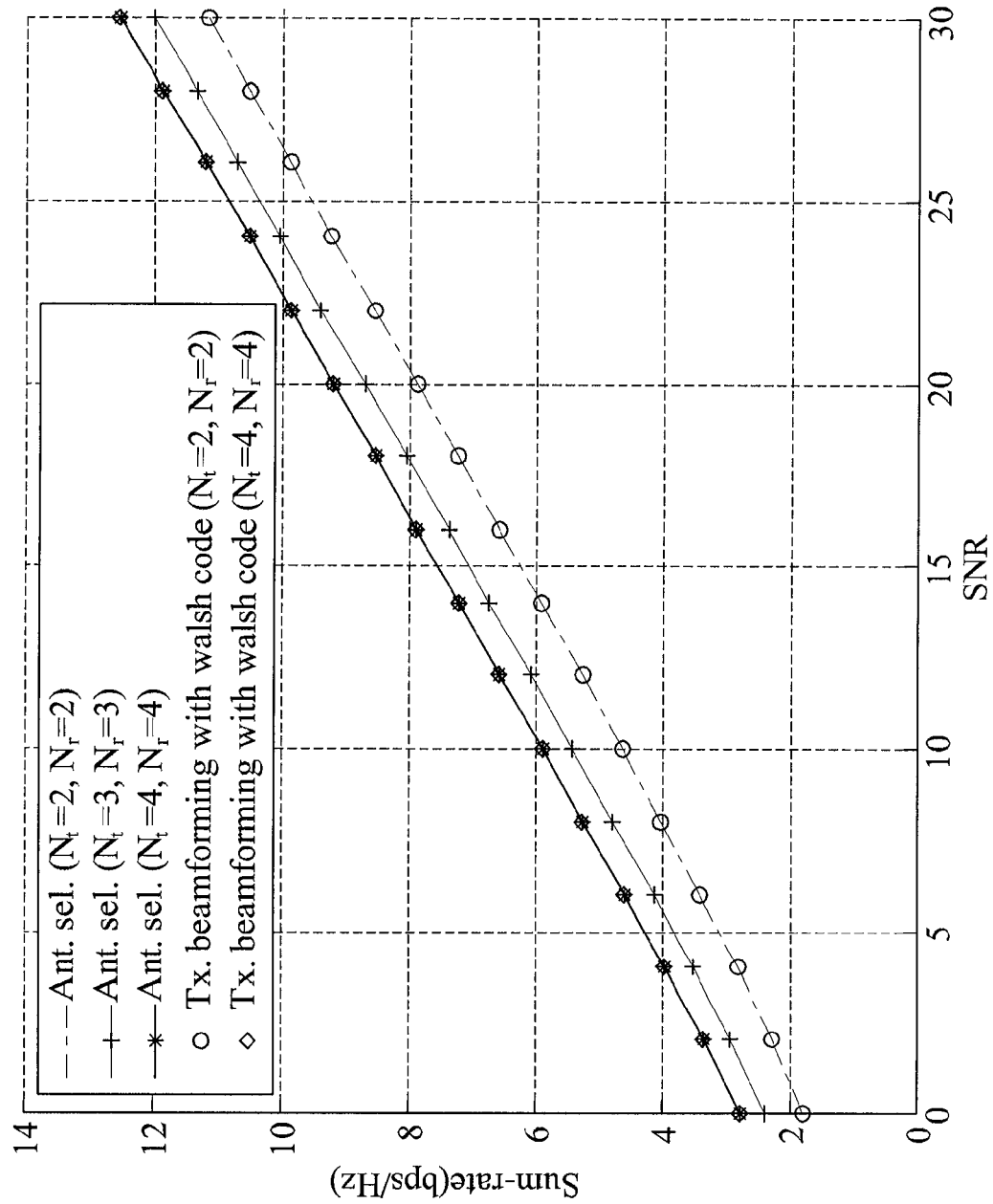
FIG. 7 is a graph illustrating a performance comparison of when using an identity matrix and a Walsh code as a codebook in a transmission/reception apparatus having two, three, and four antennas according to an embodiment of the present invention.
Figure 8:
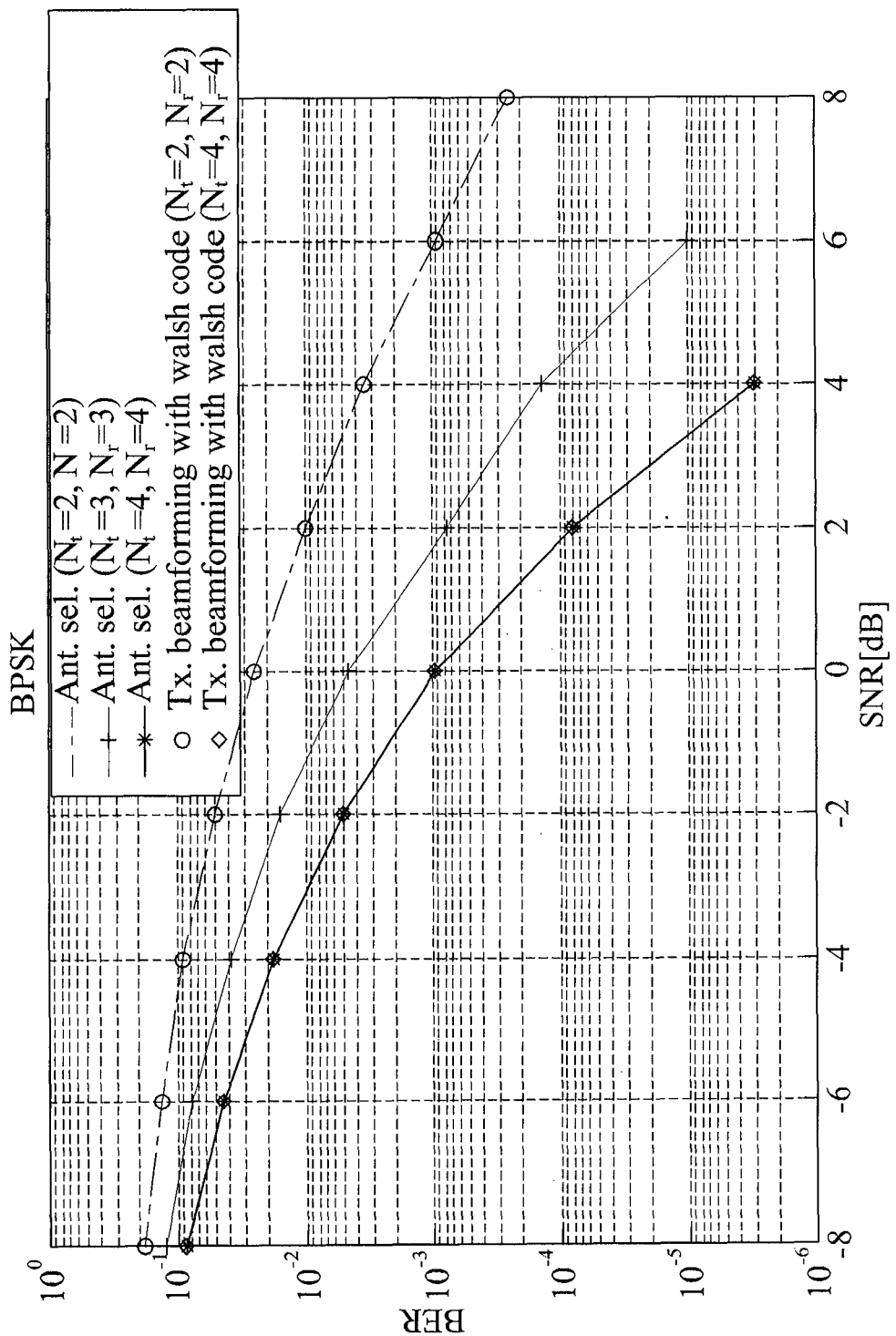
FIG. 8 is a graph illustrating a performance comparison of a bit error rate according to a signal-to-noise ratio (SNR) when using an identity matrix and a Walsh code as a codebook in a transmission/reception apparatus having two, three, and four antennas according to an embodiment of the present invention.

FIG. 7 is a graph illustrating a performance comparison of when using an identity matrix and a Walsh code as a codebook with respect to two, three, and four antennas. Here, it is assumed that a frequency efficiency according to an SNR is used as a performance index and a Rayleigh radio channel is used. In the graph of FIG. 7, since the result when using the identified matrix is the same as the result when selecting a transmit antenna used in a transmit antenna selection beamforming scheme, its corresponding portion is expressed as Sel. Also, a graph of FIG. 8 shows that bit error rate (BER) performance curves according to SNR also show the same performance.

Generally, the performance varies depending on a feedback transmission rate, that is, a number of bits used for feedback. Specifically, the performance may be improved as the feedback transmission is higher. According to an embodiment of the present invention, when it is necessary to increase the feedback transmission rate for a better performance, it is possible to adopt a scheme of classifying a codebook into a short codebook and a long codebook to feed back the codebook. Here, a case where a minimum feedback is required may be excluded.

According to an embodiment of the present invention, a Walsh codebook or a Hadamard codebook may be used as the short codebook. A Fourier codebook or a general long codebook that is a combination of a phase difference and amplitude may be used as the long codebook.

Also, according to an embodiment of the present invention, it is possible to adopt a switching technology capable of switching from the short codebook to the long codebook based on a performance.

For example, when a received output value calculated using a codebook vector value of the short codebook is less than a predetermined threshold, a multiple antenna reception apparatus may switch from the short codebook to the long codebook. The received output value may be a received output SNR value, a received signal power value, a cross-correlator output value, a log-likelihood ratio (LLR) value, or any received output value that may be expressed as a combination thereof.

The threshold for switching may be determined based on a threshold required in an adaptive modulation.

As an embodiment of the present invention, the following Table 1 shows a threshold that is set based on quadrature amplitude modulation (QAM) in an uncoded system when using the SNR value.

TABLE 1

| n | $\gamma''T[dB]$ for $BER_0 = 10^{-2}$ | $\gamma''T[dB]$ for $BER_0 = 10^{-3}$ | $\gamma''T[dB]$ for $BER_0 = 10^{-4}$ |
|---|---|---|---|
| 2 | 4.32 | 6.79 | 8.34 |
| 3 | 7.07 | 9.65 | 11.30 |
| 4 | 7.88 | 10.52 | 12.21 |
| 5 | 10.84 | 13.58 | 15.30 |
| 6 | 11.95 | 14.77 | 16.52 |
| 7 | 15.40 | 18.01 | 19.79 |
| 8 | 16.40 | 19.38 | 21.20 |

In the above Table 1, n denotes the modulation size. For example, n=2 denotes a $2^n$-QAM, that is, 4-QAM or quadrature phase shift keying (QPSK). Where n=8, $2^8$=256 and thus n=8 denotes 256-QAM. Here, $g_T{}^n$ denotes a threshold that is required in each modulation in order to satisfy a particular BER. For example, referring to the above Table 1, a threshold satisfying 16-QAM of 0.001 (BER=$10^{-3}$) is 10.52 dB.

As described above, the multiple antenna reception apparatus may use a codebook where a switching threshold is set to correspond to the required modulation size by referring to the above Table 1 and thereby may satisfy the required performance at all times. Since the multiple antenna reception apparatus does not use the long codebook more than necessary, it is possible to simplify the complexity of the multiple antenna transmission apparatus.

The embodiments of the present invention include computer-readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A multiple antenna communication method comprising:
   determining a weighting vector with respect to a plurality of transmit antennas, using a spread spectrum code;
   determining a target transmission rate of each of the transmit antennas using the determined weighting vector;
   transmitting information associated with the target transmission rate to a multiple antenna reception apparatus;
   requesting the multiple antenna reception apparatus for a codebook index to determine the weighting vector;
   receiving, from the multiple antenna reception apparatus, channel information including information regarding whether to accept the transmitted target transmission rate information and the codebook index in response to the request;
   performing a second decision for the weighting vector by referring to the received codebook index; and
   transmitting data to the multiple antenna reception apparatus using the received channel information.

2. The method of claim 1, further comprising:
   changing the determined weighting vector to retransmit the target transmission rate when the channel information is not received from the multiple antenna reception apparatus for a predetermined period of time.

3. The method of claim 1, further comprising:
   changing the determined weighting vector to retransmit the data when a reception confirm message for the transmitted data is not received from the multiple antenna reception apparatus for a predetermined period of time.

4. The method of claim 3, further comprising:
   retransmitting the target transmission rate in order to reset a communication link in association with changing of the weighting vector.

5. The method of claim 1, wherein the spread spectrum code includes a Walsh code or a Hadamard matrix.

6. A multiple antenna communication method comprising:
   determining a weighting vector with respect to a plurality of receive antennas, using a spread spectrum code;
   measuring a channel state value of each of the receive antennas using the determined weighting value;
   comparing the measured channel state value and a predetermined codebook value in advance to determine whether to accept information associated with a target transmission rate determined from a predetermined weighing vector that is transmitted from a multiple antenna transmission apparatus;
   searching for a codebook index to determine a weighting vector of each transmit antenna of the multiple antenna transmission apparatus through comparison between the channel state value and the codebook value in response to a request from the multiple antenna transmission apparatus;
   feeding back, to the multiple antenna transmission apparatus, channel information including information regarding whether to accept the transmitted target transmission rate information and the retrieved codebook index; and performing a second decision for the predetermined weighting vector by referring to the received codebook index.

7. The method of claim 6, wherein the determining of the weighting vector comprises:
predicting a channel associated with the plurality of receive antennas; and
determining the weighting vector with respect to the plurality of receive antennas based on the predicted channel.

8. The method of claim 6, further comprising:
comparing the measured channel state and a predetermined threshold; and
switching the codebook to a second codebook according to the comparison result.

9. The method of claim 6, further comprising:
making a number of feedback bits used in the codebook correspond to a number of bits of the second codebook by repeatedly using bits of the codebook.

10. A multiple antenna communication method comprising:
determining a target transmission rate based on a predetermined weighting vector;
receiving a channel state value based on a weighting vector that is measured by a plurality of receive antennas of a multiple antenna reception apparatus, via a plurality of transmit antennas;
determining a modulation scheme and performing a second decision of the target transmission rate based on the received channel state value; and
modulating data according to the determined modulation scheme to transmit the modulated data to the multiple antenna reception apparatus at the determined target transmission rate.

11. The method of claim 10, wherein the determining of the modulation scheme and the target transmission rate comprises:
determining a corresponding channel state is excellent to determine the modulation scheme and the target transmission rate as a high order modulation scheme and a high target transmission rate when the received channel state value is greater than or equal to a predetermined value; or
determining the corresponding channel state is poor to determine the modulation scheme and the target transmission rate as a low order modulation scheme and a low target transmission rate when the received channel stage value is less than the predetermined value.

12. A multiple antenna communication system comprising:
a vector decision unit to determine a weighting vector with respect to a plurality of transmit antennas, using a spread spectrum code;
a transmission rate decision unit to determine a target transmission rate of each of the transmit antennas using the determined weighting vector;
a transmitter to transmit information associated with the target transmission rate to a multiple antenna reception apparatus; and
a receiver to receive, from the multiple antenna reception apparatus, channel information including information regarding whether to accept the transmitted target transmission rate information,
wherein the transmitter transmits data to the multiple antenna reception apparatus using the received channel information, the receiver requests the multiple antenna reception apparatus for a codebook index to determine the weighting vector and receives the codebook index from the multiple antenna reception apparatus in response to the request, and the vector decision unit performs a second decision for the weighting vector by referring to the received codebook index.

13. The system of claim 12, wherein:
when the channel information is not received from the multiple antenna reception apparatus for a predetermined period of time, the vector decision unit changes the determined weighting vector, and
the transmitter retransmits the target transmission rate that is re-determined based on the changed weighting vector.

14. The system of claim 12, wherein:
when a reception confirm message for the transmitted data is not received from the multiple antenna reception apparatus for a predetermined period of time, the vector decision unit changes the determined weighting vector, and
the transmitter retransmits the data at the target transmission rate that is re-determined based on the changed weighting vector.

15. The system of claim 12, wherein the spread spectrum code includes a Walsh code or a Hadamard matrix.

16. A multiple antenna communication system comprising:
a vector decision unit to determine a weighting vector with respect to a plurality of receive antennas, using a spread spectrum code;
a channel measurement unit to measure a channel state value of each of the receive antennas using the determined weighting value;
a decision unit to compare the measured channel state value and a predetermined codebook value in advance and determine whether to accept information associated with a target transmission rate determined from a predetermined weighing vector that is transmitted from a multiple antenna transmission apparatus; and
a transmitter to feed back, to the multiple antenna transmission apparatus, channel information including information regarding whether to accept the transmitted target transmission rate information and the retrieved codebook index for performing a second decision for the predetermined weighting vector by referring to the received codebook index.

17. The system of claim 16, wherein the vector decision unit predicts a channel associated with the plurality of receive antennas and determines the weighting vector with respect to the plurality of receive antennas based on the predicted channel.

* * * * *